(12) United States Patent
Vissenberg et al.

(10) Patent No.: US 8,746,936 B2
(45) Date of Patent: Jun. 10, 2014

(54) LUMINAIRE AND OPTICAL COMPONENT

(75) Inventors: Michel Cornelis Josephus Marie Vissenberg, Eindhoven (NL); Marcellinus Petrus Carolus Michael Krijn, Eindhoven (NL); Bastiaan Uitbeijerse, Helmond (NL)

(73) Assignee: Koninklijke Philips N.V., Eindhoven (NL)

( * ) Notice: Subject to any disclaimer, the term of this patent is extended or adjusted under 35 U.S.C. 154(b) by 114 days.

(21) Appl. No.: 13/392,637

(22) PCT Filed: Sep. 13, 2010

(86) PCT No.: PCT/IB2010/054109
§ 371 (c)(1),
(2), (4) Date: Feb. 27, 2012

(87) PCT Pub. No.: WO2011/033437
PCT Pub. Date: Mar. 24, 2011

(65) Prior Publication Data
US 2012/0155081 A1 Jun. 21, 2012

(30) Foreign Application Priority Data
Sep. 18, 2009 (EP) .................................... 09170733

(51) Int. Cl.
*F21V 5/02* (2006.01)

(52) U.S. Cl.
USPC ................. 362/340; 362/311.02; 362/268

(58) Field of Classification Search
USPC ................. 362/330, 268, 331, 310, 309, 340, 362/311.01, 311.02
See application file for complete search history.

(56) References Cited

U.S. PATENT DOCUMENTS

| | | | |
|---|---|---|---|
| 3,811,754 A | 5/1974 | Morrell et al. | |
| 5,506,924 A | 4/1996 | Inoue | |
| 6,142,652 A * | 11/2000 | Richardson | 362/280 |
| 6,540,382 B1 * | 4/2003 | Simon | 362/339 |
| 7,006,306 B2 * | 2/2006 | Falicoff et al. | 359/800 |
| 7,021,805 B2 * | 4/2006 | Amano et al. | 362/518 |
| 7,418,188 B2 | 8/2008 | Winston et al. | |
| 7,424,197 B2 | 9/2008 | Winston et al. | |
| 2004/0047161 A1 * | 3/2004 | Mochizuki et al. | 362/511 |
| 2007/0139798 A1 | 6/2007 | Epstein | |

* cited by examiner

*Primary Examiner* — Peggy A. Neils
(74) *Attorney, Agent, or Firm* — Yuliya Mathis

(57) ABSTRACT

It is presented an optical component (5) a first side (30) and a refractive opposite side (14). The refractive side (14) presents a refractive surface (13) and has radially extending refractive structures (6) for refracting light mainly in the azimuth direction (27) of an inciding light beam. The optical component (5) can be used as an exit window in a luminaire (1) having at least one light source (4), whereby light inhomogeneity may be reduced.

8 Claims, 5 Drawing Sheets

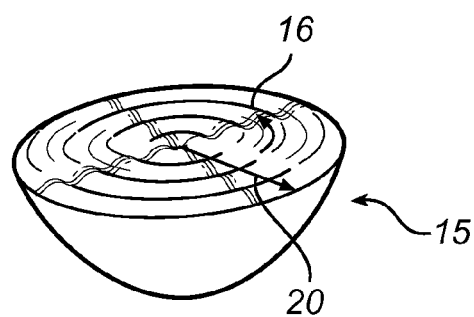
(Prior art) *Fig. 1a*
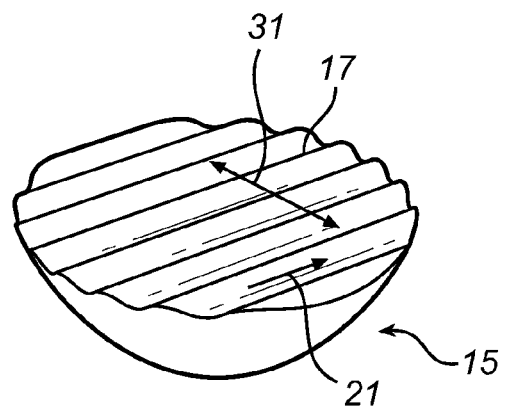
(Prior art) *Fig. 1b*
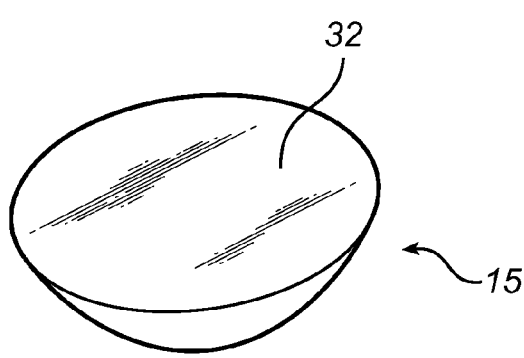
(Prior art) *Fig. 1c*

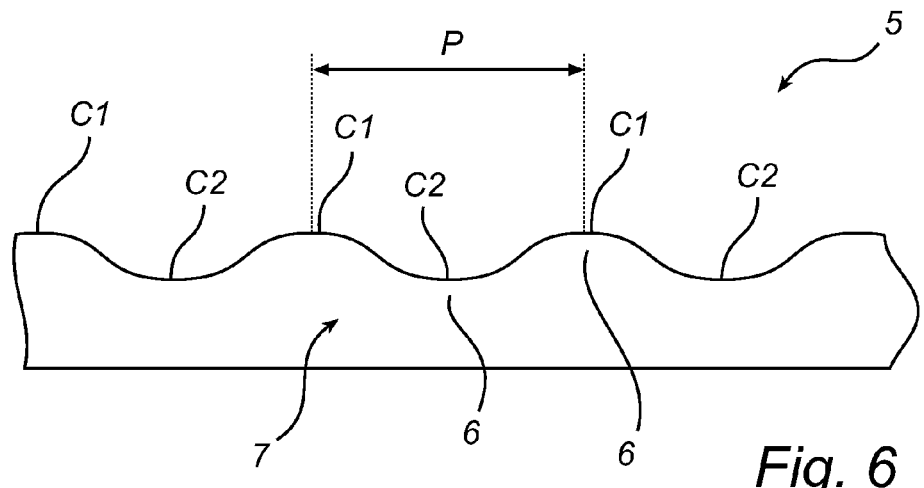
Fig. 6
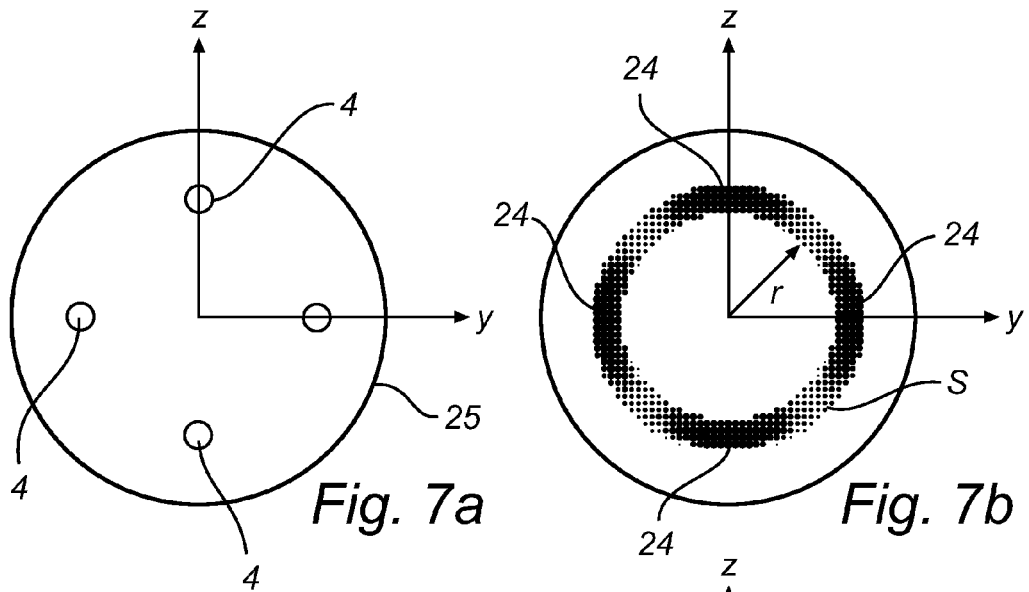
Fig. 7a
Fig. 7b
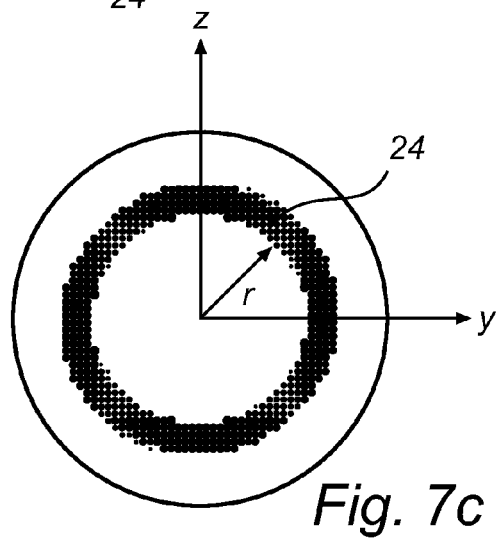
Fig. 7c

LUMINAIRE AND OPTICAL COMPONENT

FIELD OF THE INVENTION

The technical field of the present invention is lighting. In particular, the present invention relates to an optical component and a luminaire.

BACKGROUND OF THE INVENTION

In many applications, utilizing point sources of light present challenges for developers and providers of products thereof. Examples of point sources are for instance different type of semiconductor light sources such as LEDs and OLEDs.

Further development of LEDs (Light Emitting Diodes) e.g. higher luminance, have opened new areas for their use. For instance, LEDs may nowadays be utilized in general lighting applications such as luminaires. Thereby the advantages provided by LED technology, such as narrow bandwidth lighting, enhanced control, and low energy consumption, may be utilized in previously unexplored fields of use.

However, the use of LEDs in general lighting has required quite high demands on the optics used because of e.g. the high brightness provided by the LEDs.

TIR (Total Internal Reflection) collimators are widely used to shape LED light into a usable beam. They usually consist of an entrance portion, where the LED light is coupled into the light guiding medium, a tapered light guiding part to collimate the beam, and an exit window where the light beam leaves the light guiding medium. The exit window may be smooth, but it can also contain subtle structures to shape the beam further. For example, the beam width may be broadened by applying a frosted surface or a lens array on the exit window as shown in FIGS. 1a-c. FIG. 1a shows optics 15 having circular lenticulars 16 for shaping the light beam at an exit location of a lighting device (not shown). Similarly, FIGS. 1b-c show optics 15 with straight lenticulars 17 across the exit window, and frosted glass 32 respectively.

SUMMARY OF THE INVENTION

It is with respect to the above considerations and others that the present invention has been made.

In view of the above, it would therefore be desirable to achieve an improved luminaire. In particular, it would be advantageous to achieve a luminaire having improved mixing properties and which reduces beam inhomogeneities.

To better address one or more of these concerns, in a first aspect of the present invention there is provided an optical component adapted to shape a light beam, the optical component having a refractive surface through which the light beam is allowed to travel, wherein the refractive surface has a plurality of radially extending refractive structures for shaping the light beam.

Beneficially, light may be refracted mainly in the angular or azimuth direction with respect to the beam due to the radially extending refractive structures. Thereby light in the azimuth direction may be smeared out, and mixing of light in the azimuth direction may be enhanced. This may be in particular be advantageous when shaping light from several light sources of a lighting device (such as a luminaire) distributed around the optical axis of the lighting device. Further, requirements on the internal optics of the lighting device, such as diffusers and mixing cavities may be reduced and/or the aforesaid optical components may be excluded from the lighting device. Thereby, a more cost efficient and simpler lighting device may be provided.

By comparison, the optics of the prior art as discussed above, is undulating in either the radial direction (for circular lenticulars), or in a perpendicular direction with respect to the direction along which the lenticulars extend (for straight lenticulars). These optics have however essentially no curvature in the azimuth direction, and provide beam broadening and mixing mainly in the radial direction and in horizontal/vertical directions respectively.

The plurality of radially extending refractive structures may present a periodic undulating pattern in an angular direction of the refractive surface providing a uniform distribution of the refractive structures along the refractive surface in the angular direction. Undulating herein is to be understood as any wavelike shape, such as concave-concave, convex-concave, convex-convex etc. Thereby, light luminance may be smeared out uniformly in the azimuth direction.

The optical component may have a center and a periphery, and wherein the plurality of radially extending refractive structures extend outwardly from the center towards the periphery.

Hereto, light may be smeared out in the azimuth direction along any annular section of the optical component.

Each of the plurality of radially extending refractive structures may have a width that increases linearly in the angular direction as a function of a distance from a center of the optical component.

Thereby uniform distribution of the refractive structures may be achieved.

Each of the plurality of radially extending refractive structures may be lenticular. In this context, lenticular is to be construed as being lenticular in the azimuth direction. Further, lenticular may mean e.g. convex, concave, convex-concave and so on. The optical component described hereabove may be included in a luminaire comprising at least one light source adapted to provide a light beam and collimating optics for beam collimation.

The optical component may present an exit window for a light beam of the luminaire. An exit window in this context is to be construed as the final component along the optical axis in the luminaire, from which light emanates from the luminaire.

The refractive surface may define a far side of the optical component with respect to the at least one light source. Thus, the refractive surface is positioned on an "outer" side of the luminaire, whereby the first side is the first side on which light incides.

Thereby enhanced control of the light beam may be achieved when the light first enters the dense medium via a planar surface, and is refracted when going to air. In contrast, if the light is first refracted by the refractive structures, and then by the planar surface, light rays have a larger probability to have TIR (Total Internal Reflection) at the first side (e.g. the planar surface), and stay inside the material (and hence get scattered uncontrollably).

The luminaire may comprise a plurality of light sources, each light source being located at least at a distance d from an optical axis O of said luminaire, wherein a radius r of said optical component is at least as large as said distance d. Hence each light source may be refracted efficiently by the optical component.

The collimating optics may comprise a rotationally symmetric wedge for collimating the light beam, the wedge being arranged between the at least one light source and the optical component. Thereby light may be collimated and distributed over a large area prior to entering the optical component.

The above aspect and others of the invention will be apparent from and elucidated with reference to the embodiments described hereinafter.

BRIEF DESCRIPTION OF THE DRAWINGS

This and other aspects of the present invention will now be described in more detail, with reference to the appended drawings showing embodiments of the invention.

FIGS. 1a-c show perspective views of optical exit window components of the prior art.

FIG. 6 is a top view of a portion of the optical component in FIG. 5.

FIGS. 7a-c are schematic illustrations showing a light beam being shaped by the optical component in FIG. 5.

DETAILED DESCRIPTION

Figure 2:
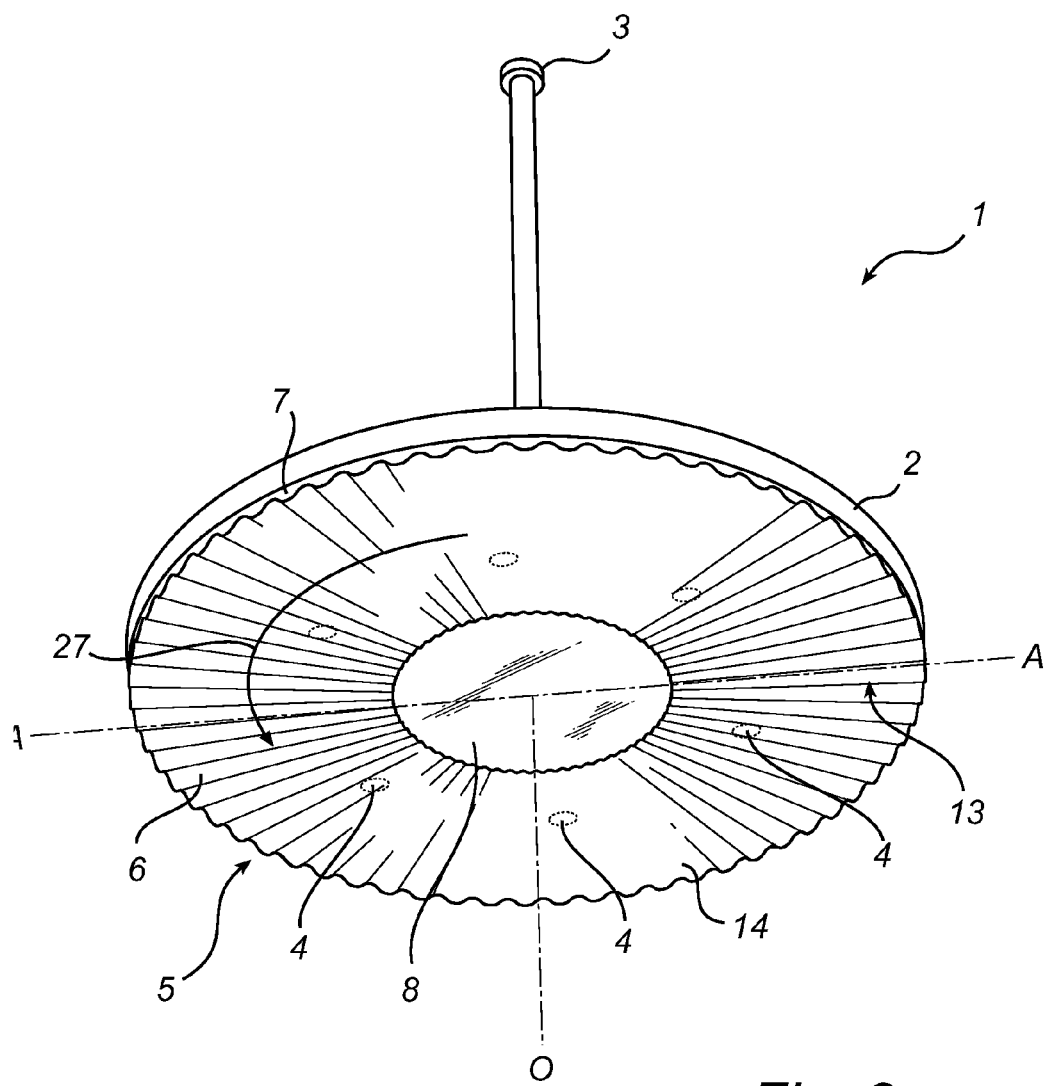
FIG. 2 shows a perspective view of a luminaire of an embodiment in accordance with the present invention.

With reference to FIG. 2, an embodiment of a luminaire 1 in accordance with the present invention is shown. The luminaire 1 comprises inter alia a housing 2, a socket 3, a cap 8, a plurality of light sources 4, which throughout the description will be exemplified by LEDs, and an optical component 5. In operational use of the luminaire 1, the optical component 5 provides an exit window for light emanating from the LEDs 4. More specifically, the optical component 5 has a refractive side 14 presenting a refractive surface 13 comprising a plurality of radially extending refractive structures 6 forming an undulating pattern 7 in an angular direction 27 on the refractive surface 13.

By means of the refractive structures 6 a light beam emanating from the plurality of LEDs can be mixed in an efficient way in the angular direction 27, referred to as the azimuth direction herebelow, of the refractive surface 13.

Beneficially, by placing the optical component 5 at a distance from the light source and presenting an exit window for the light beam, efficient mixing of the light may be obtained with a relatively small etendue loss, i.e. less beam broadening.

In the present example, the plurality of LEDs 4, which can be of multiple colors or one single color, are placed in an annular formation around a central optical axis O of the luminaire 1. Each LED 4 is placed at a distance d from the optical axis O. Due to the radial refractive structures 6, the beam is mainly broadened in the azimuth direction 27 instead of a radial direction 20 as shown in FIG. 1, whereby the beam homogeneity is increased.

Figure 3:
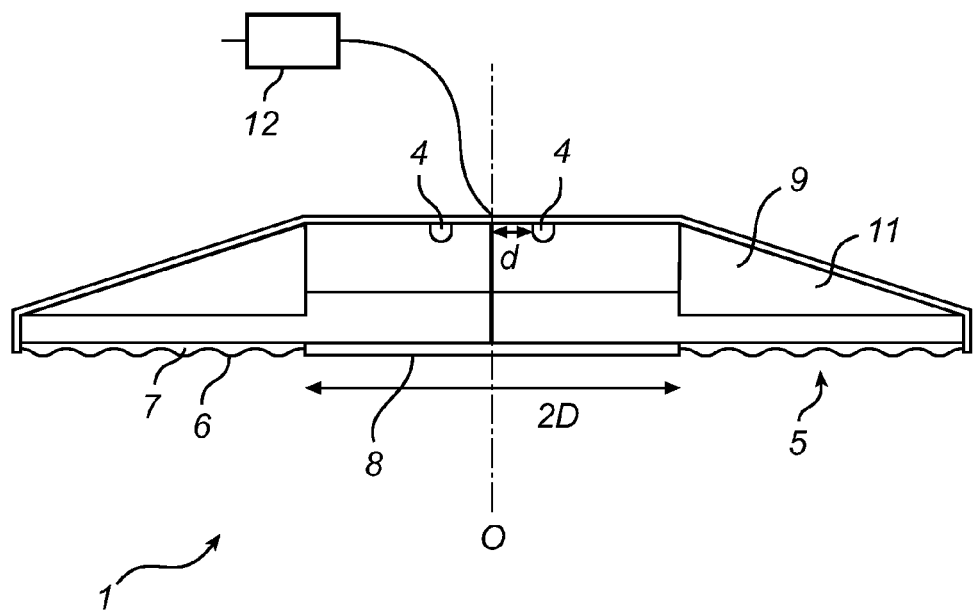
FIG. 3 shows a cross-sectional view of the luminaire in FIG. 2.

FIG. 3 shows a cross-sectional view of the luminaire 1 in FIG. 2 along an axis A. In the exemplary luminaire 1, a collimating optics 11 of the luminaire 1 comprises a rotationally symmetric wedge 9 for collimating, distributing the light over a large area, and broadening the light beam (not shown) emanating from the plurality of LEDs 4. Each LED 4 is displaced by distance d from the optical axis O. The optical component 7 presents an exit window for the light beam, and cap 8, which may be opaque, which may block centrally distributed light in the luminaire 1. The luminaire 1 can be controlled and powered by a drive component 12.

Figure 4:
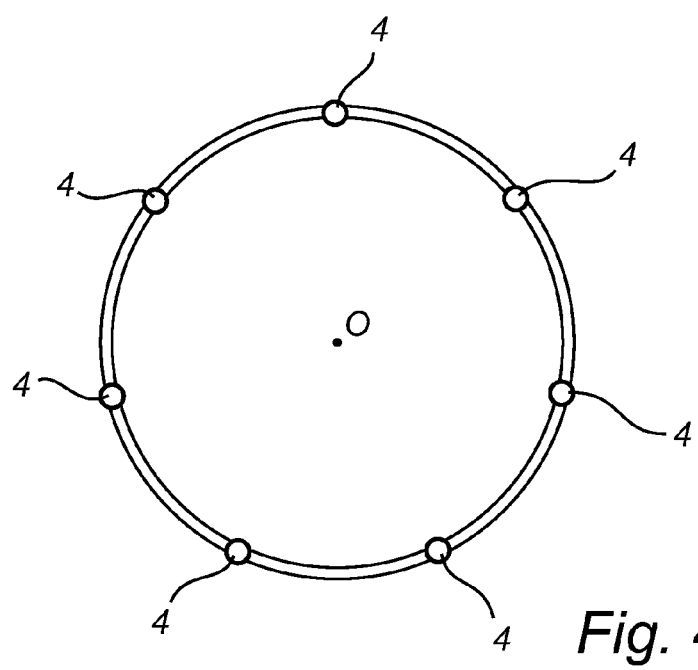
FIG. 4 shows a top view of an LED arrangement of the luminaire in FIG. 1.

The LEDs 4 are placed annularly centered around the optical axis O, as shown by the top view in FIG. 4.

Figure 5:
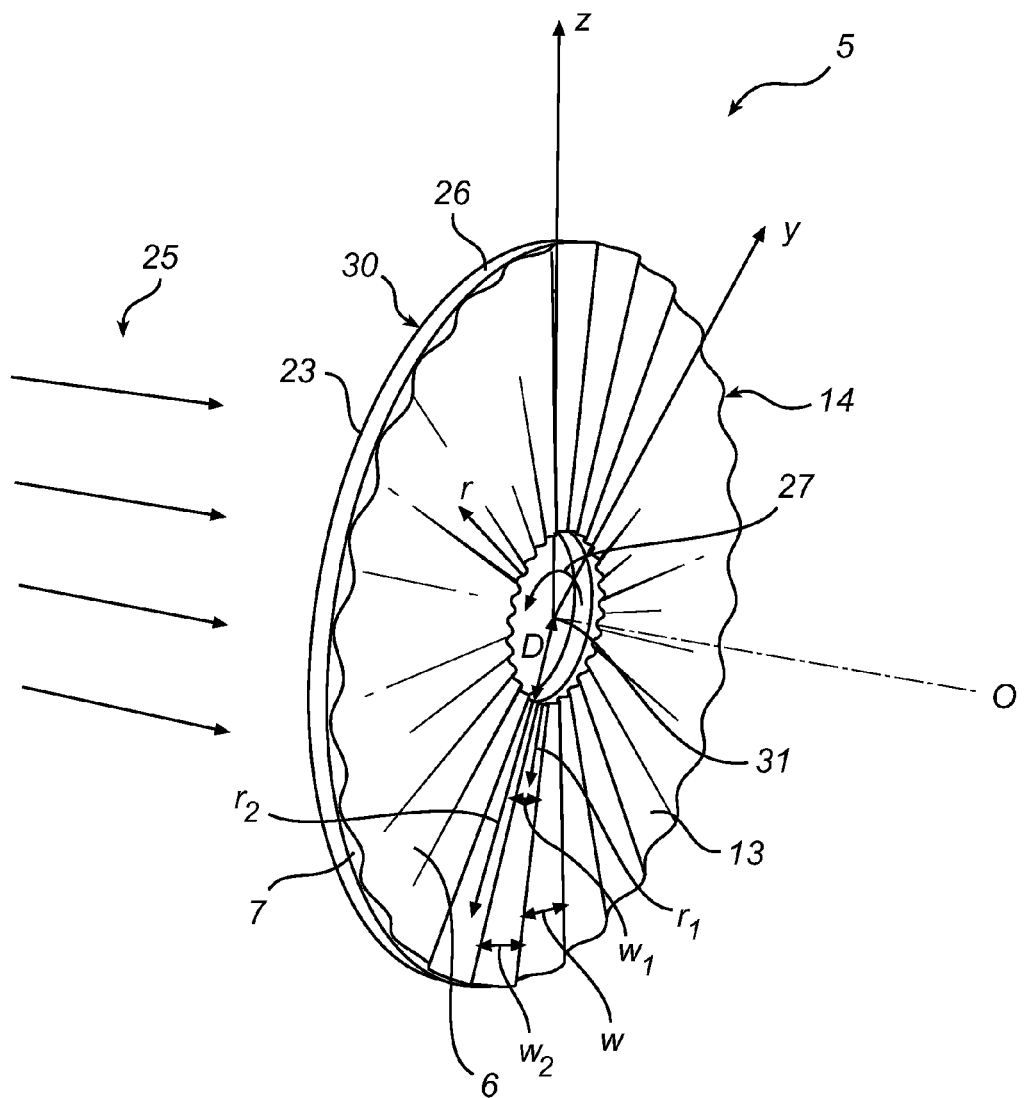
FIG. 5 is an enlarged view of an optical component of the luminaire in FIG. 1.

With reference to FIG. 5, a perspective view of the optical component 5 in FIG. 2 is shown. In the exemplary embodiment, the light beam incides from the left. Thereby, light enters the optical component on a first side 30 presenting a first surface 23 which is substantially planar. Subsequently, the light beam exits via the refractive surface 13 on the refractive side 14. The optical component 5 has a hole with diameter D about a center 31, whereby the radially extending refractive structures 6 extend from distance D from the optical axis O (the center 31) to a periphery 26 of the optical component 5. The cap 8 shown in FIGS. 2 and 3 has a diameter substantially 2*D.

The refractive structures 6 are uniformly distributed along the refractive surface 13 of the refractive side 14 in the azimuth direction 27 for any radii r thereon. Thereby a symmetric reduction of light inhomogeneity may be achieved. Further, each refractive structure 6 is sector shaped, i.e. a width w between any two refractive structures 6 increases linearly as the distance from the center 31 increases. The width w is thus a function of the radius r of the optical component 5. Thus, $w_1 < w_2$ if $r_1 < r_2$. A width w of each refractive element 6 is hence increasing in the azimuth direction 27 as a function of the distance r from the center 31 of the optical component 5.

Along the azimuth direction 27, which is tangential to the beam profile, the refractive structures 6 are undulating 7. Undulating is to be understood as any wavelike shape, such as concave-concave, convex-convex, or concave-convex. In this specific example however, the undulating pattern is concave-convex. A portion of the optical component 5 can be seen from the side in FIG. 6. In the azimuth direction 27 the refractive structures 6 present a periodic pattern with period P. In the exemplary embodiment, the period P comprises a convexity C1 and a concavity C2. In variations of the embodiment, for instance concave-concave, as well as convex-convex periods P are also possible.

The optical components 5 has substantially zero curvature along any straight line crossing the origin of the z-y plane shown in FIG. 5, whereas the azimuth direction 27 presents an undulating pattern 7. Thereby, the light beam can be broadened mainly in the azimuth direction 27, and thus providing efficient mixing of the light from LEDs 4 along the direction in which the light beam is inhomogeneous.

FIGS. 7a-c show an example of how the optical component 5 mixes the light provided by four LEDs 4 placed in a ring around the optical axis O. A cross section along the optical axis O of the beam 25 is shown in which LEDs 4 are placed (in the background) at 12 o'clock, 3 o'clock, 6 o'clock and at 9 o'clock, thereby exemplifying a luminaire with its light sources 4 spaced apart. Such a placement of the LEDs 4 has previously put high demands on the optics, implying high costs for the optical system.

FIG. 7b shows a far-field view of the light beam before passing the optical component 5. A small annular section S at an arbitrary distance r from the central optical axis O around the light beam is highlighted. The angular illuminance distribution 24 is illustrated schematically. For simplicity, luminance has only been illustrated within the section S.

As can be seen in FIG. 7b, the illuminance is concentrated to areas close to the location of the LEDs 4 of FIG. 7a. In the azimuth direction 27, between any pair of LEDs 4, the luminance decreases.

It should be noted that the distance d of the LEDs 4 from the optical axis O typically is less than the radius r of the optical component 5.

A situation when the beam 25 has passed through the exit window, i.e. the optical component 5, is shown in FIG. 7c. The illuminance 24 is more evenly distributed ("smeared out") in the annular section S compared to that shown in FIG. 7b. This is due to the refraction of the light by means of the curvature presented by each refractive structure 6 in the azimuth direction 27 and that each refractive structure 6 extends radially towards the periphery 26.

Other variations than those presented above are also possible within the scope of the invention. For instance, the optical component 5 can be a continuous disc without a central hole. Further, the optical component 5 need not be circular, but may have any suitable shape. Moreover, the refractive structures 7 may also be directed towards the light source(s) 4, whereby the first side 30 would provide a light exit side for the light beam. Also, the first surface need not be planar or substantially planar, but may for instance comprise in-coupling structures for in-coupling of light into the optical component 5, or other optical structures for beam shaping. To this end, the optical component 5 may for instance be comprised as a part of a collimating structure, whereby the refractive side 14 can present an exit window for a light beam when assembled in e.g. a luminaire.

Even further, the light sources 4 need not be placed symmetrically around the optical axis O, and they need not be placed at a distance d from the optical axis O, but may be located on the central optical axis O (e.g. one light source or multi-dye LED package). Further, the light sources could be placed at varied distances from the optical axis O.

Applications of the present invention include, but are not limited to, indoor environments such as office environments, home environments, hotels, and shopping centers, as well as outdoor environments. More costly and/or bulky optics for shaping light may thereby be replaced by the invention presented herein.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measures cannot be used to advantage. Furthermore, any reference signs in the claims should not be construed as limiting the scope.

The invention claimed is:

1. A luminaire having an optical axis, comprising:

a plurality of light sources placed in a ring around the optical axis of the luminaire, such that each light source is located at a distance (d) from the optical axis, wherein at least one light source includes an LED; and an optical component adapted to shape a light beam emitted by the light sources, said optical component having a refractive surface through which said light beam is allowed to travel, wherein said refractive surface has a plurality of radially extending refractive structures for shaping said light beam, wherein a radius of said optical component is at least as large as said distance (d), and wherein said plurality of radially extending refractive structures present a periodic undulating pattern in an angular direction of said refractive surface providing a uniform distribution of said refractive structures along said refractive surface in said angular direction.

2. The luminaire as claimed in claim 1, wherein said optical component has a center and a periphery, and wherein said plurality of radially extending refractive structures extend outwardly from said center towards said periphery.

3. The luminaire as claimed in claim 1, wherein each of said plurality of radially extending refractive structures has a width (w) that increases linearly in the angular direction as a function of a distance (r) from a center of said optical component.

4. The luminaire as claimed in claim 1, wherein each of said plurality of radially extending refractive structures is lenticular.

5. The luminaire as claimed in claim 1, wherein said optical component presents an exit window for said light beam from said luminaire after passing said refractive surface.

6. The luminaire as claimed in claim 1, wherein said refractive surface defines a far side of said optical component with respect to said light sources.

7. The luminaire as claimed in claim 1, further comprising collimating optics comprising a rotationally symmetric wedge having a central portion for collimating said light beam, said wedge being arranged between said light sources and said optical component.

8. The luminaire as claimed in claim 1, wherein at least two of said plurality of light sources are adapted to emit light of different color.

* * * * *